(No Model.)
W. COOKE & D. CARLOUGH.
UPSETTING MACHINE.
No. 376,295. Patented Jan. 10, 1888.
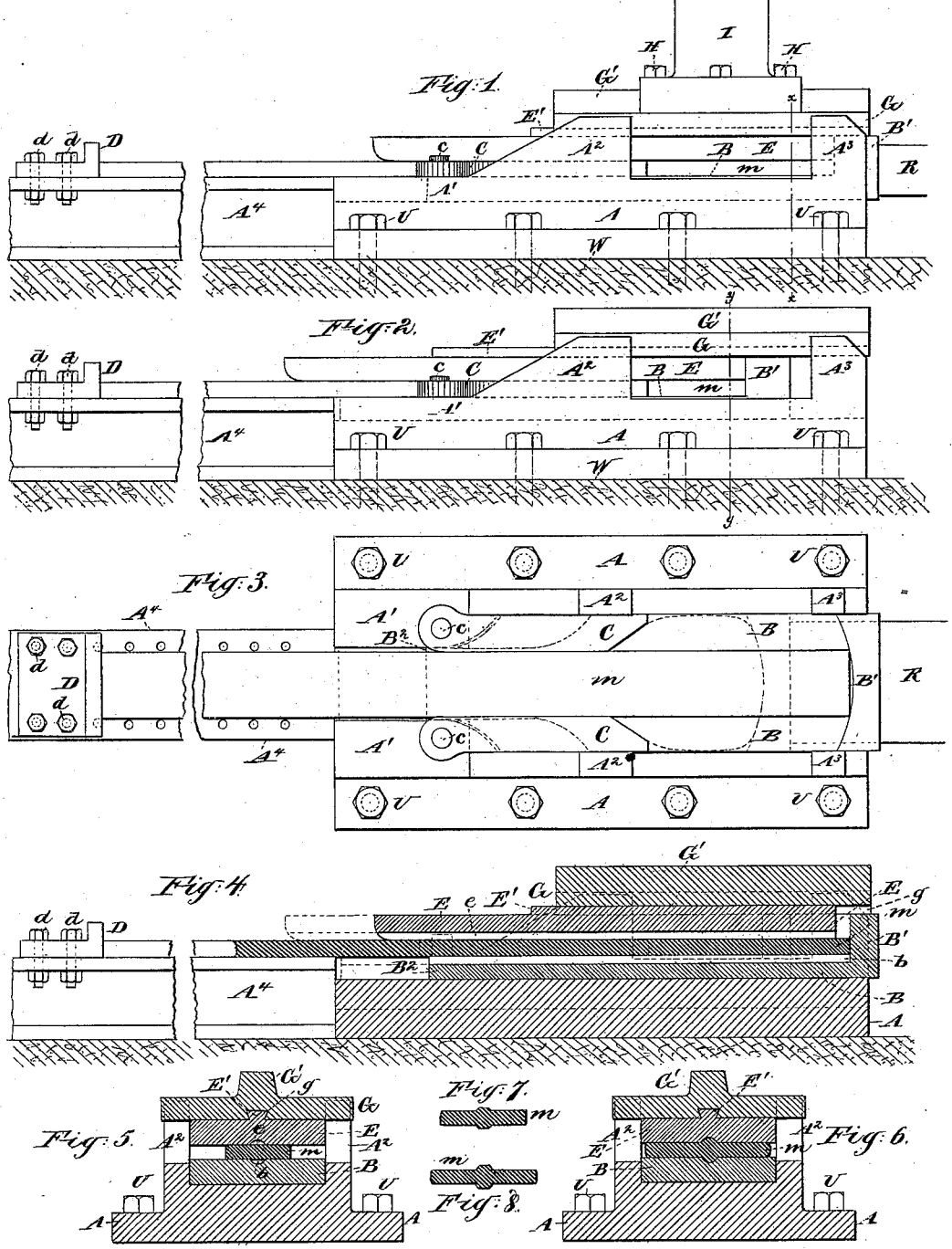
Witnesses:
Charles R. Searle
H. A. Johnstone
Inventors:
Watts Cooke
Daniel Carlough
by their attorneys
Thomas Drew Stetson

UNITED STATES PATENT OFFICE.

WATTS COOKE AND DANIEL CARLOUGH, OF PATERSON, NEW JERSEY.

UPSETTING-MACHINE.

SPECIFICATION forming part of Letters Patent No. 376,295, dated January 10, 1888.

Application filed October 21, 1887. Serial No. 252,953. (No model.)

*To all whom it may concern:*

Be it known that we, WATTS COOKE and DANIEL CARLOUGH, both of Paterson, in the county of Passaic and State of New Jersey, have invented a certain new and useful Improvement in Upsetting-Machines, of which the following is a specification.

It is common in connecting together distant portions of trusses, arches, and other structures of iron to use tie-bars, either all in one length or in several lengths coupled together, each tie-bar or length being of uniform section throughout except that it is enlarged at each end to give sufficient material to receive the transverse pin or to otherwise lock the bar to the next bar or to the work which is to be held. Experience has demonstrated that this can be done satisfactorily by taking bars which are rolled of uniform section throughout and thickening and widening the required portions by compressing them endwise, technically termed "upsetting." We have in patents already issued to us described machines intended for this purpose. The present invention is a further improvement in the same direction.

In our patent dated October 13, 1885, No. 328,290, we set forth provisions for moving the lower surface horizontally with the ram and we left the upper surface without such horizontal movement. When the soft iron or steel at and near the end of the bar is held between these upper and lower surfaces and is moved endwise by the ram at the end, the particles immediately adjacent to the ram move therewith, but the particles at distances therefrom move successively less and less until at a certain point which is to form the neck of the eye the particles of hot metal in the bar are firmly held and are not moved endwise to any appreciable extent. It is obviously impossible to make the surfaces of a rigid die coincide in its motion with all parts of the metal which is being upset. In our patent of 1885, above referred to, we sought to compromise by causing the entire lower surface to move with the ram and the entire upper surface to refuse to move horizontally at all.

Our present improvement makes a radically new departure therefrom in causing both the upper and lower surfaces to move with the ram. The friction of the surfaces against the hot metal tends to induce an excess of upsetting force in that portion of the eye most distant from the ram or header; but at that portion the metal is usually cooler. Our experiments indicate that it induces a practically uniform upsetting action throughout the whole length which is to be upset. We use removable and exchangeable cheeks which allow a single bed-die or foundation-piece and a single header or ram to serve in upsetting bars of all sizes and thicknesses. We can use with this improved machine the invention which is set forth in our patent dated July 13, 1886, No. 345,573, and we will thus describe it, changing the construction in that respect only by using a groove in each of the upper and lower surfaces instead of a ridge in each. Our grooves will produce a ridge on the upper and lower faces of the eye, which can be easily obliterated under the hammer.

The accompanying drawings form a part of this specification and represent what we consider the best means of carrying out the invention.

Figure 1 is a side elevation showing the parts before the upsetting. Fig. 2 is a corresponding elevation showing the same after the upsetting. Fig. 3 is a plan view corresponding to Fig. 1, but with the top die removed. Fig. 4 is a longitudinal vertical section showing in strong lines the position of the parts before the upsetting. The dotted lines in this figure show the parts after the upsetting. Figs. 5, 6, 7, and 8 are vertical sections. Fig. 5 is a section on the line $x\ x$ in Fig. 1. The metal is in the condition before the upsetting operation has commenced. Fig. 6 is a corresponding section on the line $y\ y$ in Fig. 2. In this figure the upsetting has been completed. Fig. 7 is a corresponding section through the metal alone after the upsetting has commenced, but before it has proceeded far. Fig. 8 is a similar view showing the condition after the upsetting is nearly completed.

Similar letters of reference indicate corresponding parts in all the figures where they occur.

We employ a strong bed-casting, the horizontal base of which is marked A. Other portions will be designated farther on by additional marks, as $A'$ $A^2$, &c. The bottom slide rests fairly on A and is free to move longitudinally thereon to the limited extent required. We will mark the main body of this slide B, using additional marks, as B', to designate other portions.

B' is a broad ledge, which we will term a "header," fixed at one end of B. It receives the force of the ram R and applies it to press strongly endwise against the hot metal $m$ which is being treated.

B² is a tongue or a narrow extension at the opposite end of B. A groove, $b$, is produced longitudinally along the central line of B B².

A' A' are stout elevated portions lying each side of the tongue B². They are cast in one with the bed.

A² A³ are pairs of stout uprights, also cast in one with A.

The elevated portions A' support smooth headless pins or cylindrical uprights $c$ $c$, of sufficient strength, on which are applied removable cheeks C C, which lie within the uprights A² and are properly shaped to form the neck of the eye. The beam or long horizontal extension A⁴ from the bed A is perforated with holes which receive bolts $d$, which secure a stop, D, in adjustable positions thereon. The stop should be so placed as to abut firmly against the end of the bar to enable it to resist the strong end force to be impressed by the ram R. When the upper die is raised, the properly-heated end of the bar to be upset is thrust in from the left, extending between the stop D and cheeks C C and abutting against the header B'.

The upper die is compounded. Its lower and working-face is a slide, E, which is free to move horizontally with the ram. This slide has on its upper face a longitudinal rib, E', of dovetail section, which is received in a corresponding longitudinal groove, $g$, planed or otherwise nicely formed in the top part, G, which latter is rabbeted at the corners to be received between and strongly guided by the pairs of uprights A² A³. The part G is only allowed a directly up-and-down motion. Its upper face has a rib, G'. Bolts H confine it to the plunger I of a hydraulic ram, (not shown), which, it will be understood, forces the two parts G E downward when required. When the water is turned off from the hydraulic ram which actuates I, the latter and the entire compound upper die are raised by a weight. (Not shown.) All the parts not shown or specifically described may be of the construction ordinarily adopted with this class of machines.

When, by the working of a steam-piston (not shown) or other sufficient force, the ram R is moved endwise against B', moving it and its attachments to the left, the heated portion of the bar, extending longitudinally between the header B' and the cheeks C, is upset and shortened, with a necessary tendency to be both thickened and widened. The thickening is resisted by the bottom slide, B, and the top slide, E, and the groove $b$ in the lower and the groove $e$ in the upper slide receive a portion of the metal and produce a ridge in the hot metal which is being upset. This ridge is commenced early in the upsetting operation and aids greatly to resist any tendency of the bar to buckle sidewise during the upsetting. In practice the empty spaces above and below and the springing of the parts, and possibly a slight yielding of the hydraulic press, allow the portion of the hot metal which is being upset to slightly increase its thickness; but the main extension in the upsetting is widthwise. There is nothing in our present machine to limit the expansion of the eye laterally in both directions. The metal naturally does so, being kept in the central position by the ridges lying in the grooves $b$ and $e$. So soon as the upsetting movement is completed the ram R is, by the working of the attached piston, (not shown,) drawn out to its original position, and the top parts, E G, are, by the working of the attached plunger I, drawn upward. The entire top is lifted clear of the uprights A² A³ to a sufficient extent to allow the bar $m$, with its widened and slightly thickened head or eye, to be lifted out and moved away.

The bed A is fastened upon a suitable support, W, by means of bolts U.

The groove $e$ along the central line of the lower face of the upper slide, E, may be of the same width and section as the groove $b$ in the lower slide, B.

Whenever it is desired to treat wider or narrower bars, the cheeks C C are removed, being readily lifted off from the pins $c$ $c$, and a new pair supplied which are wider or narrower. A stock of cheeks, C, of different widths being provided, the machine can be altered in a few minutes or seconds to adapt it to treat any size of bar. Bars of different thickness may also be treated by the aid of cheeks C of different thickness; but this is not so essential. It is desirable that the cheeks shall be a little less high than the thickness of the bar to be treated. There may be a considerable difference in this respect without involving any serious mischief.

It will be understood that any irregularity in the shape of the outline of the head or eye is afterward corrected by treating it in other finishing-swages; also, that the hole in the center of the eye is punched by ordinary or suitable means after the eye is in other respects nearly or quite finished.

The uprights A² A³, cast on the bed A, have their inner faces, which are presented toward each other, perpendicular. They match in corresponding rabbets in the corners of the upper die, G, and hold it firmly against horizontal movement, while they allow it to move freely up and down. The arrangement leaves a space at each side of the eye entirely open. The operation of upsetting may be inspected by the attendant by looking at the metal through these openings. In the possible case that proper care in inserting the bars centrally, coupled with the effect of the ridge formed by the metal by being upset in the grooves $b$ $e$, does not sufficiently keep in line the metal which is to form the eye, and that in rare instances the metal intended for the eye will cramp or buckle to one side, the attendant who is critically watching the edge nearest him can, by reason of the open sides of the die, instantly detect the disposition of the metal to thus buckle, and can stop the upsetting operation before it has proceeded too far.

Modifications may be made without departing from the principle or sacrificing the advantages of the invention. The lower slide, B, may be of greater or less thickness than here shown. The tongue $B^2$ may be of greater or less width and length. So, also, the top slide, E, may be of greater or less thickness. The rib $E'$ may be of T-shaped section instead of dovetailed. In such case the groove $g$ in G should be correspondingly formed. There may be two or more of the ribs $E'$ and grooves $g$.

It will be understood that there may be any number of clamping devices or other means for holding the bar in addition to the stop D or instead thereof. It will usually be the case that the bar $m$ is of considerable length, and we provide an extended support to accommodate it. The bar may be clamped upon the support at many different points along its length, if desired in any case.

Instead of grooving the upper and lower slides, there may be a ridge along the middle of each. Such would correspond to the device shown in our patent of 1886, above referred to. We esteem it preferable to produce grooves in the slides, for the reason, among others, that in the upsetting operation the slides move beyond the heated part of the eye and present the grooved surface against the neck and adjacent portion of the bar. No mischief results from thus presenting the grooved surface. The moving of ridged slides against the cold and hard part of the bar would involve difficulty.

Parts of the invention may be used without the whole. We can dispense with the tongue $B^2$ and extend the elevated portion $A'$ of the bed continuously across from one side to the other of the machine, letting that stationary part serve as the support under the neck of the eye; but it is preferable to support the eye on the moving surface afforded by the tongue.

The machine may serve well with only one of the slides grooved; but we prefer the whole, as shown.

We claim as our invention—

1. In combination with a suitable under die and header, the compound upper die, E G, the part G fitted to move up and down between guides $A^2 A^3$, and the part E attached thereto with liberty to slide longitudinally, as herein specified.

2. In an upsetting-machine, the compound upper die, E G, and operating-plunger I, in combination with the bed A and bottom slide, B, having the ledge $B'$, and with the ram R and stop D, all substantially as herein specified.

3. In an upsetting-machine, the longitudinally-grooved bottom slide, B $b$, and longitudinally-grooved top slide, E $e$, in combination with each other and with the operating-ram R, and lateral guides constructed and arranged, as shown, so as to leave the sides open and allow inspection of the edges of the eye during the act of upsetting, as herein specified.

4. In an upsetting-machine, the removable and exchangeable cheeks C C, in combination with upper and lower dies and with a ledge, $B'$, and stop for holding the bar against the thrust of the header, so as to allow the same machine to be used in treating bars of different sizes, substantially as herein specified.

In testimony whereof we have hereunto set our hands, at Paterson, Passaic county, New Jersey, this 15th day of October, 1887, in the presence of two subscribing witnesses.

WATTS COOKE.
DANIEL CARLOUGH.

Witnesses:
WM. M. SMITH,
J. H. BLANNETT.